(12) United States Patent
Sumita et al.

(10) Patent No.: US 8,436,563 B2
(45) Date of Patent: May 7, 2013

(54) CONTROL UNIT AND CONTROL METHOD FOR PERMANENT MAGNET SYNCHRONOUS MOTOR

(75) Inventors: Satoshi Sumita, Hitachi (JP); Kazuaki Tobari, Hitachiota (JP); Shigehisa Aoyagi, Hitachi (JP); Daisuke Maeda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 368 days.

(21) Appl. No.: 12/827,736

(22) Filed: Jun. 30, 2010

(65) Prior Publication Data

US 2011/0006715 A1  Jan. 13, 2011

(30) Foreign Application Priority Data

Jul. 9, 2009  (JP) ................ 2009-162556

(51) Int. Cl.
*H02P 6/00* (2006.01)
*H02K 29/06* (2006.01)

(52) U.S. Cl.
USPC ............. 318/400.32; 318/254; 318/400.11; 318/400.12; 318/400.34

(58) Field of Classification Search ........... 318/254, 318/432, 400.04, 400.11, 400.32, 400.34, 318/400.35, 400.12
See application file for complete search history.

(56) References Cited

U.S. PATENT DOCUMENTS

| | | | | |
|---|---|---|---|---|
| 4,835,448 A | * | 5/1989 | Dishner et al. | 318/400.11 |
| 5,780,983 A | * | 7/1998 | Shinkawa et al. | 318/400.04 |
| 5,955,861 A | * | 9/1999 | Jeong et al. | 318/701 |
| 6,121,736 A | * | 9/2000 | Narazaki et al. | 318/400.35 |
| 7,084,603 B2 | * | 8/2006 | Taguchi et al. | 318/808 |
| 7,122,980 B2 | * | 10/2006 | Kuroshima et al. | 318/400.11 |
| 7,224,133 B2 | * | 5/2007 | Nakatsugawa et al. | 318/400.01 |
| 7,342,367 B2 | * | 3/2008 | Suzuki | 318/400.04 |
| 7,667,419 B2 | * | 2/2010 | Fukamizu et al. | 318/400.34 |
| 2004/0257030 A1 | * | 12/2004 | Taguchi et al. | 318/808 |
| 2006/0076911 A1 | * | 4/2006 | Kuroshima et al. | 318/254 |
| 2007/0236168 A1 | * | 10/2007 | Suzuki | 318/812 |
| 2008/0018279 A1 | * | 1/2008 | Fukamizu et al. | 318/432 |

FOREIGN PATENT DOCUMENTS

| | | |
|---|---|---|
| JP | 63-178189 A | 7/1988 |
| JP | 2005-137106 A | 5/2005 |
| JP | 2007-166695 A | 6/2007 |
| JP | 2009-55681 A | 3/2009 |

OTHER PUBLICATIONS

Japanese Office Action including partial English language translation dated Nov. 22, 2011 (Seven (7) pages).

* cited by examiner

*Primary Examiner* — Paul Ip
(74) *Attorney, Agent, or Firm* — Crowell & Moring LLP

(57) ABSTRACT

If magnitude relations between the output terminal voltage based on a DC negative terminal of the inverter and a threshold voltage that is a fixed value are compared, polarity thereof is changed at a predetermined rotor phase. The magnitude relation, for example, is detected by an inexpensive and simple apparatus such as a level shift circuit and a NOT circuit. The rotor phase of the permanent magnet synchronous motor is inferred on the basis of changes in the magnitude relation and if it is differentiated, a rotation speed is inferred. If the inferred values of the rotor phase and rotation speed are fed back to synchronous operation or vector control, the free-running permanent magnet synchronous motor is restarted.

14 Claims, 12 Drawing Sheets

US 8,436,563 B2

CONTROL UNIT AND CONTROL METHOD FOR PERMANENT MAGNET SYNCHRONOUS MOTOR

CLAIM OF PRIORITY

The present application claims priority from Japanese patent application serial No. 2009-162556, filed on Jul. 9, 2009, the content of which is hereby incorporated by reference into this application.

FIELD OF THE INVENTION

The present invention relates to a control unit and a control method for a permanent magnet synchronous motor (PMSM) and more particular to a control unit and a control method for inferring the rotor phase and rotation speed of a free-running motor and restarting the permanent magnet synchronous motor from the free run condition.

BACKGROUND OF THE INVENTION

When a fan is mounted to the permanent magnet synchronous motor for the purpose of air blowing, the motor may be considered to run free due to the air blowing. The same may be said with a pump and to smoothly restart the free-running permanent magnet synchronous motor, it is necessary to detect the rotor phase and rotation speed during free running. However, direct detection of the rotor phase and rotation speed by a position sensor causes an increase in cost in correspondence to the position sensor. Therefore, to decrease the cost, an art for inferring the rotor phase and rotation speed of the free-running permanent magnet synchronous motor without using the position sensor is proposed.

For example, the method described in Patent Document 1 may be cited. When the electromotive force (EMF) generated in the free-running permanent magnet synchronous motor is impressed to the output terminal of the inverter, the two inter-line voltages are compared with each other and the rotor phase and rotation speed are inferred from the magnitude of the difference between them. By doing this, the permanent magnet synchronous motor can be restarted continuously from the free run condition without stopping. However, to make a comparison between the inter-line voltages, a comparator is required and a problem arises that the cost and mounting area increase.

Furthermore, the method described in Patent Document 2 may be cited. The output terminal voltage of the inverter is measured using an A/D port and the rotor phase and rotation speed are inferred from changes in the measured values. To measure the three-phase output terminal voltage, three A/D ports are necessary originally and a means for realizing it only by one A/D port is proposed. However, instead of it, a transistor and an I/O port must be used and the transistor must be switched to ON or OFF at high speed.

DOCUMENT OF PRIOR ART

Patent Document 1: Japanese Patent Laid-open No. 2005-137106
Patent Document 2: Japanese Patent Laid-open No. 2007-166695

SUMMARY OF THE INVENTION

The problem of the present invention, to solve the aforementioned problems, is to infer the rotor phase and/or rotation speed of the free-running permanent magnet synchronous motor using a simple and inexpensive apparatus and restart and operate the motor.

The present invention, in an aspect thereof, a control unit of a permanent magnet synchronous motor comprising a DC power supply, an inverter for converting DC power supplied from the DC power supply to AC power, and the permanent magnet synchronous motor supplied with the AC power via an output terminal of the inverter includes a means for inferring the phase of a rotor of the permanent magnet synchronous motor on the basis of the magnitude relation between an inter-line voltage based on a minimum value of an electrical potential generated at the output terminal of the inverter and a predetermined threshold voltage when the permanent magnet synchronous motor runs free.

The present invention, in another aspect thereof, includes a means for comparing an inter-line voltage which is a voltage between a DC negative terminal of the inverter and at least a one-phase output terminal other than the minimum value with the predetermined threshold voltage and inferring the phase of the rotor of the permanent magnet synchronous motor on the basis of the magnitude relation between them.

When the permanent magnet synchronous motor runs free, the output terminal voltage of the inverter changes according to the rotor phase of the permanent magnet synchronous motor. Particularly, if an optional inter-line voltage appearing between the DC negative terminal of the inverter and an AC output terminal is compared with the predetermined threshold voltage and changes in the magnitude relations between them are detected, a change according to the rotor phase can be obtained by a very simple circuit. Therefore, on the basis of the magnitude relation, the rotor phase of the permanent magnet synchronous motor can be inferred.

Further, the inferred rotor phase is differentiated, thus the rotation speed is inferred.

The inferred values of the rotor phase and rotation speed are fed back to the synchronous operation control or vector control, thus the free-running permanent magnet synchronous motor is restarted.

According to the preferred embodiments of the present invention, the magnitude relation between the output terminal voltage to the DC negative terminal of the inverter and a predetermined threshold voltage is detected by a simple and inexpensive apparatus, and the phase and/or rotation speed of the free-running permanent magnet synchronous motor is inferred, and the free-running permanent magnet synchronous motor can be restarted and operated.

DESCRIPTION OF THE PREFERRED EMBODIMENTS (First Embodiment)

Figure 1:
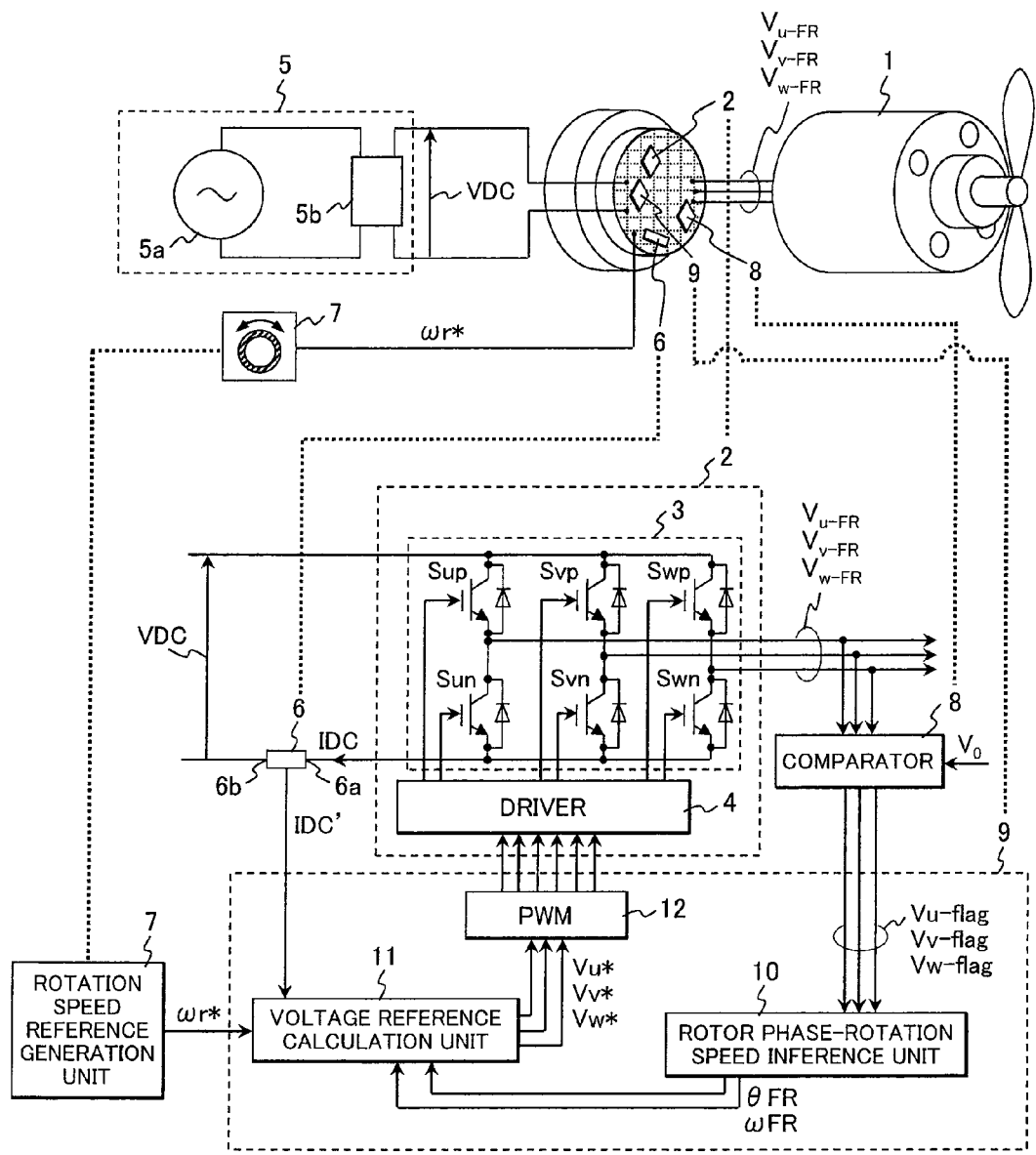
FIG. 1 is a schematic view of the control unit of the permanent magnet synchronous motor of the first embodiment of the present invention.

FIG. 1 is a schematic view of the control unit of the permanent magnet synchronous motor of the first embodiment of the present invention.

A permanent magnet synchronous motor 1 outputs motor torque composed of a torque component due to the magnetic flux of the permanent magnet and a torque component due to the inductance of the armature winding. A one-chip inverter IC 2 is composed of an inverter main circuit unit 3 and a driver 4. The driver 4 turns on or off switching elements Sup, Sun, Svp, Svn, Swp, and Swn of the inverter main circuit unit 3 according to a PWM signal and converts the DC voltage to a three-phase AC voltage. A DC voltage generation unit 5 is composed of an AC power supply 5a and a converter 5b and impresses a DC voltage VDC to the inverter IC 2. A current detection unit 6 outputs a detected value IDC' of a current IDC flowing from the inverter IC 2 into the DC voltage generation unit 5. A rotation speed reference generation unit 7 generates a rotation speed reference ωr*. A comparator 8 compares output terminal voltages $V_{u\text{-}FR}$, $V_{v\text{-}FR}$, and $V_{w\text{-}FR}$ of the inverter IC 2 with a threshold voltage $V_0$ and outputs flags Vu-flag, Vv-flag, and Vw-flag indicating the magnitude relations thereof.

A microcomputer 9, on the basis of the detected current value IDC', decides the PWM signal so as to control a rotation speed ω of the permanent magnet synchronous motor 1 to the rotation speed reference ωr*. The microcomputer 9 is composed of a rotor phase-rotation speed inference unit 10, a voltage reference calculation unit 11, and a PWM signal generation unit 12. The rotor phase-rotation speed inference unit 10, on the basis of the flags Vu-flag, Vv-flag, and Vw-flag, outputs a rotor phase inferred value θFR and a rotation speed inferred value ωFR of the free-running permanent magnet synchronous motor 1. The voltage reference calculation unit 11, on the basis of a predetermined constant of the permanent magnet synchronous motor 1, the rotor phase inferred value θFR, and the rotation speed inferred value ωFR, or the current value IDC', outputs voltage references Vu*, Vv*, and Vw*. The PWM signal generation unit 12, on the basis of the voltage references Vu*, Vv*, and Vw*, outputs the PWM signal.

The control unit stores the inverter IC 2, current detection unit 6, comparator 8, and microcomputer 9 in one chip so as to realize compactness and modularization. By doing this, the assembly of the control unit is made easy and the degree of freedom of installation is enhanced. However, the realization of compactness and modularization is not indispensable and for example, a three-phase inverter may be used in place of the inverter IC. In this case, the control unit is made larger, though the control performance is not influenced essentially.

Hereinafter, each unit will be explained in detail.

If the permanent magnet synchronous motor 1 runs free, electromotive force E is generated. The electromotive force E is the product of an electromotive force coefficient Ke and the rotation speed ω of the permanent magnet synchronous motor 1 and is expressed by Formula (1).

$$E = Ke \cdot \omega \tag{1}$$

The electromotive force E is impressed to the terminals of U-phase, V-phase, and W-phase that are connections of the permanent magnet synchronous motor 1 to the inverter IC 2. Assuming the base of the phase θ of the permanent magnet synchronous motor 1 as a U-phase winding position and the neutral point of the permanent magnet synchronous motor 1 as a reference potential, the phase electromotive forces of U-phase, V-phase, and W-phase are expressed by Formula (2).

$$Vu = -E \cdot \sin \theta$$

$$Vv = -E \cdot \sin\{\theta - (2\pi/3)\}$$

$$Vv = -E \cdot \sin\{\theta + (2\pi/3)\} \tag{2}$$

Figure 2:
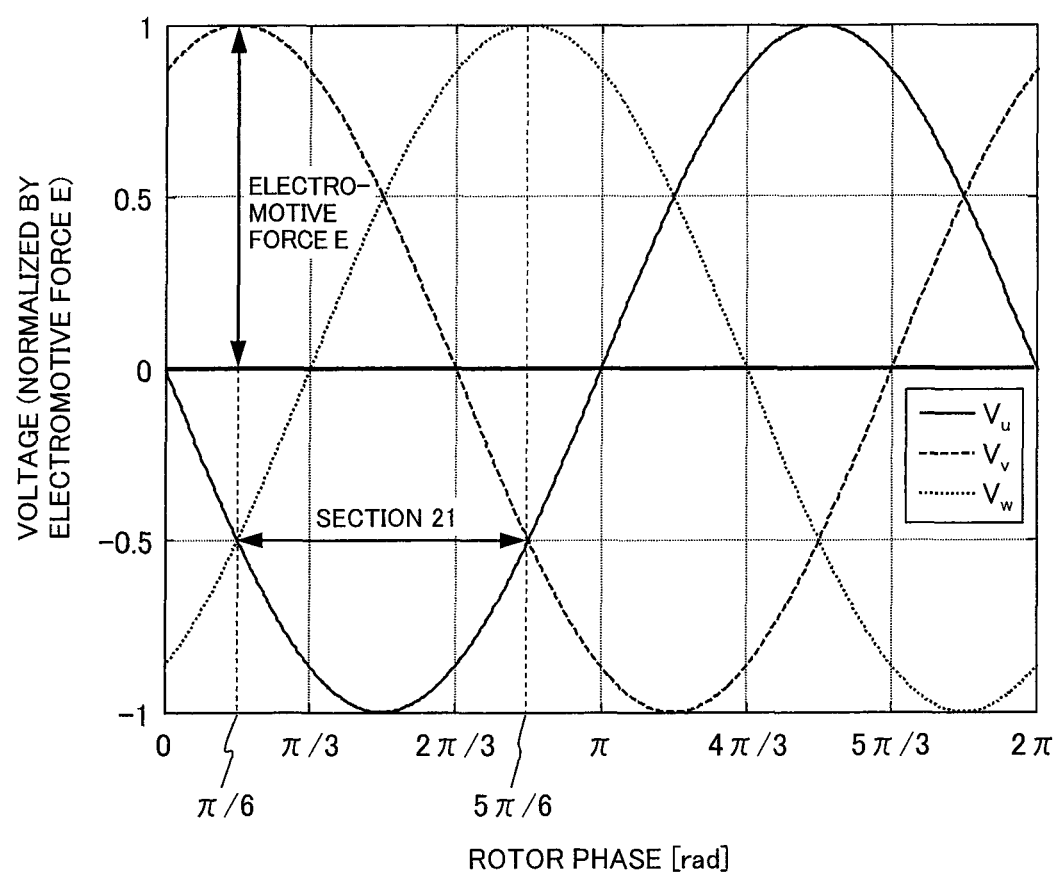
FIG. 2 is a waveform diagram of the phase electromotive force generated in the permanent magnet synchronous motor.

Namely, as shown in FIG. 2, Vu, Vv, and Vw indicate a sine wave of an amplitude E and the respective phases are different from each other by $2\pi/3$.

When the permanent magnet synchronous motor 1 is running free, the microcomputer 9 keeps all the switching elements of the inverter IC 2 off via the driver 4. The output terminal voltages $V_{u\text{-}FR}$, $V_{v\text{-}FR}$, and $V_{w\text{-}FR}$ of each phase when the electrical potential at a connection 6a (the DC negative terminal of the inverter 3) of the lower arm of each phase of the inverter main circuit unit 3 to the current detection unit 6 is assumed as a base will be considered. The negative pole connection electrical potential 6b of the current detection unit 6 and DC voltage generation unit 5 is assumed as a similar base.

Among the phase electromotive forces Vu, Vv, and Vw, the phase of the minimum voltage value is assumed as a minimum phase of electromotive force. For example, the case that θ is expressed by Formula (3) will be considered.

$$\pi/6 \leq \theta \leq 5\pi/6 \tag{3}$$

In the range indicated by Formula (3), that is, in a section 21 shown in FIG. 2, the minimum phase of electromotive force is the U phase. Here, $V_{u\text{-}FR}$ is lower than the reference potential by a forward voltage Vf of the free wheel diode of the lower arm, though Vf in an actual circuit is very little, so that it is expressed by Formula (4).

$$V_{u\text{-}FR} = -Vf \approx 0 \tag{4}$$

Further, $V_{v\text{-}FR}$ is a voltage higher than $V_{u\text{-}FR}$ of the reference potential by the inter-line voltage, so that it is expressed by Formula (5).

$$V_{v\text{-}FR} = V_{u\text{-}FR} + Vu - Vv = Vu - Vv \tag{5}$$

$V_{w\text{-}FR}$ can be obtained similarly.

Figure 3:
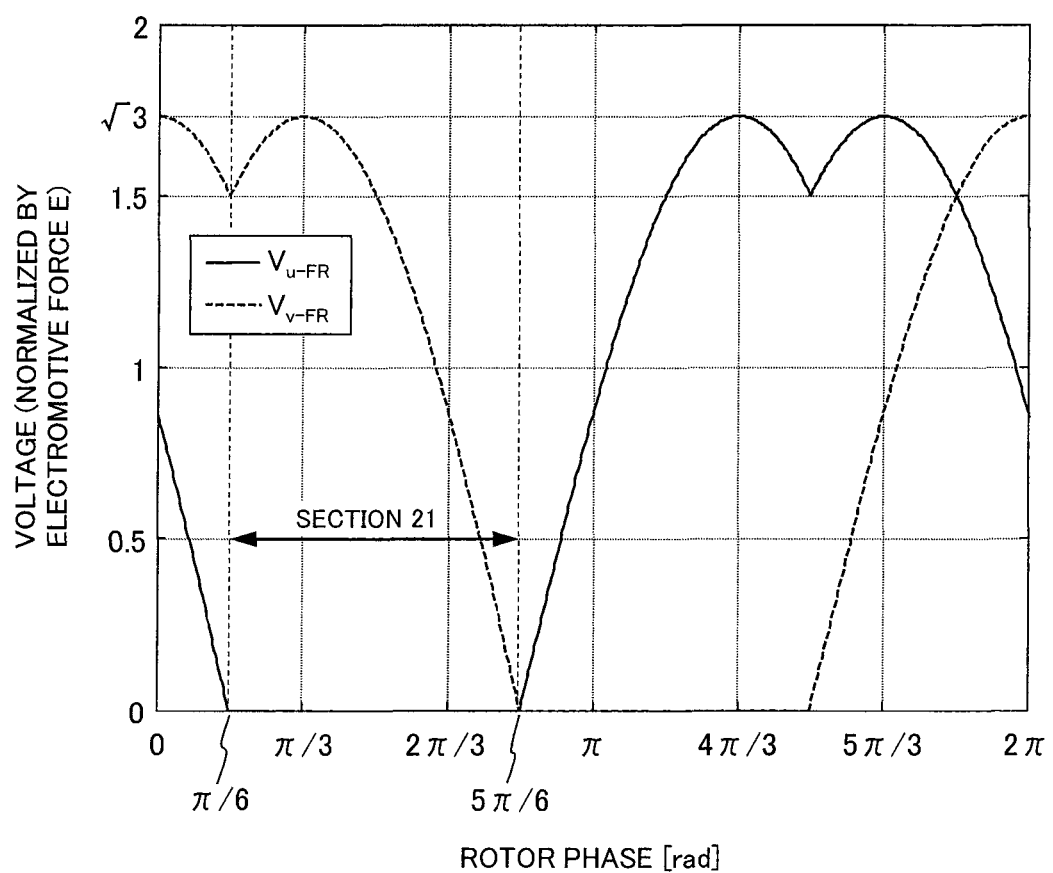
FIG. 3 is a waveform diagram of the output terminal voltage generated in the permanent magnet synchronous motor.

By application of the aforementioned, not only in the section 21, for an optional phase $\theta$, $V_{u\text{-}FR}$, $V_{v\text{-}FR}$, and $V_{w\text{-}FR}$ can be obtained. Namely, for an optional phase $\theta$, the minimum phase of electromotive force is obtained from Formula (2) or FIG. 2, and the output terminal voltage of the phase is set to zero by Formula (4), and the output terminal voltages of the other phases are set to an inter-line voltage based on the output terminal voltage of the minimum phase of electromotive force. For a phase $\theta$ equivalent to one cycle of the electric angle, if $V_{u\text{-}FR}$ and $V_{v\text{-}FR}$ are obtained, FIG. 3 is obtained. To avoid complication, an illustration is omitted, though $V_{w\text{-}FR}$ has a similar waveform delayed from $V_{v\text{-}FR}$ by $2\pi/3$.

Concretely, as a voltage of the three-phase AC output terminal of the inverter 3 based on the potential of the DC negative terminal 6a of the inverter 3, $V_{u\text{-}FR}$, $V_{v\text{-}FR}$, and $V_{w\text{-}FR}$ can be extracted.

Figure 4:
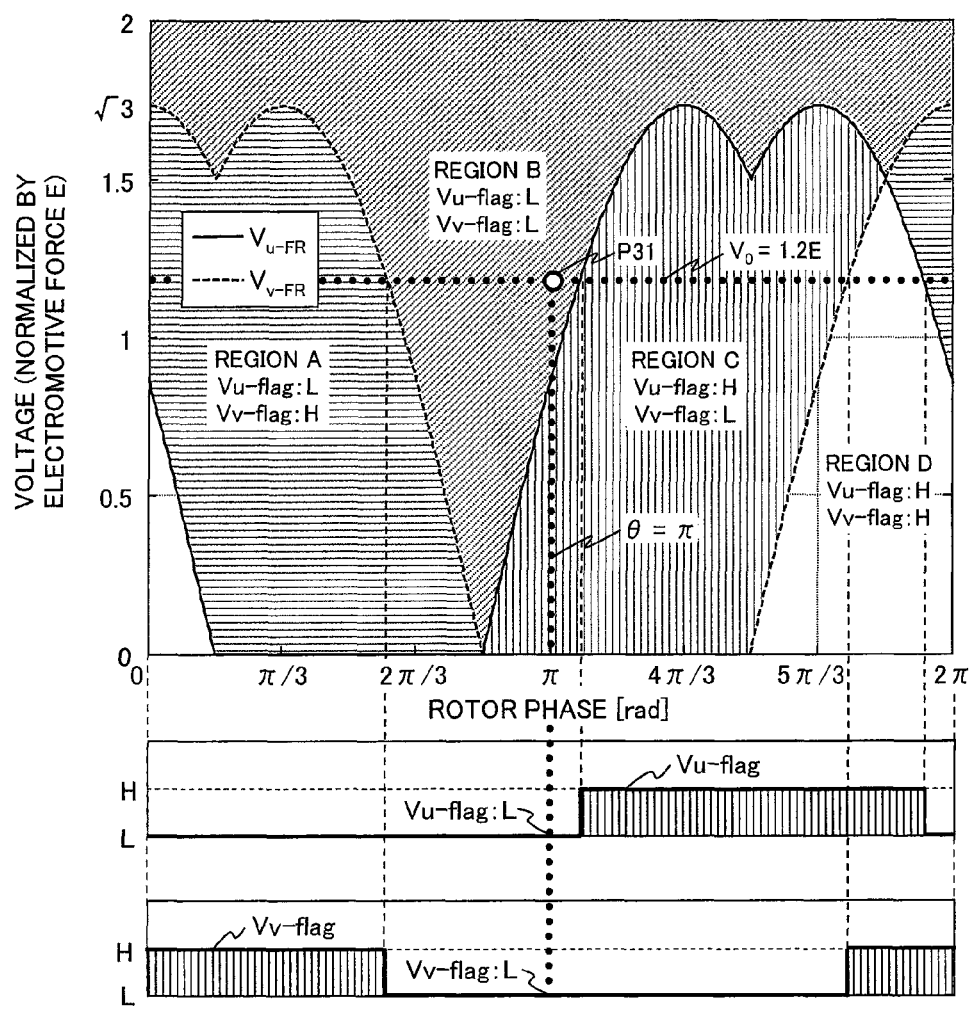
FIG. 4 is a waveform diagram of the flag outputted from the comparator.

FIG. 4 is a waveform diagram for explaining the operation of the comparator 8.

The comparator 8 compares the magnitude relations between the output terminal voltage of the inverter and the threshold voltage $V_0$ and outputs graphs indicating the magnitude relations of at least two phases. Hereinafter, the case that the magnitude relations between $V_{u\text{-}FR}$ and $V_0$ and between $V_{v\text{-}FR}$ and $V_0$ are compared and Vu-flag and Vv-flag are outputted will be explained, though instead of the flags, Vw-flag may be outputted. Further, Vu-flag, Vv-flag and Vw-flag are all outputted and the principle indicated below is applied, thus the inference precision of the phase $\theta$ can be improved.

The comparator 8 compares $V_{u\text{-}FR}$ with $V_0$ and when $V_{u\text{-}FR}$ is higher than $V_0$, outputs a signal H as Vu-flag. Further, when $V_{u\text{-}FR}$ is inversely lower than $V_0$, the comparator 8 outputs a signal L as Vu-flag. When $V_{u\text{-}FR}$ and $V_0$ are equal to each other, even if either of the signals is outputted, this system is valid, though hereinafter, it is assumed to output the signal L. The same may be said with Vv-flag.

For example, the case of Formula (6) indicated below will be considered.

$$V_o = 1.2E, \theta = \pi \tag{6}$$

In this case, the intersection point indicated by Formula (6) is P31 shown in FIG. 4. The intersection point P31 is positioned above $V_{u\text{-}FR}$ (a solid line) in the vertical axis (voltage). This means that Formula (7) indicated below is held.

$$V_o > V_{u\text{-}FR} \tag{7}$$

In this case, the signal L is outputted as Vu-flag by the comparator 8. Further, it is found that the signal L is outputted similarly as Vv-flag.

The comparator 8 can be composed of a level shift circuit and a NOT circuit.

Figure 5:
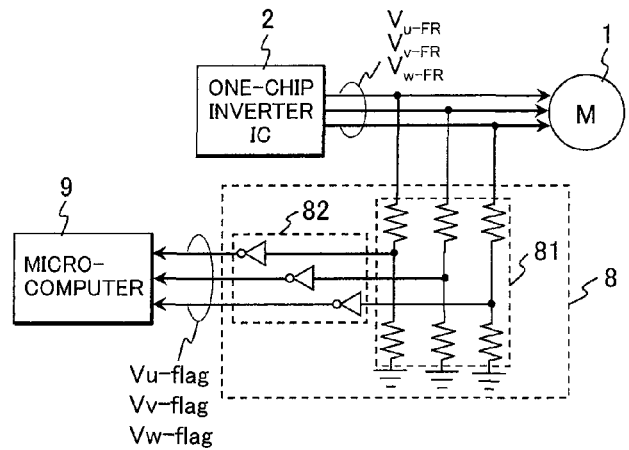
FIG. 5 is a diagram showing a concrete circuit configuration example of the comparator of the first embodiment.

FIG. 5 is a diagram of a concrete configuration example of the comparator 8 of the first embodiment of the present invention.

Namely, $V_{u\text{-}FR}$, $V_{v\text{-}FR}$, and $V_{w\text{-}FR}$ are voltage-divided by a level shift circuit 81 and the voltages are inputted to a NOT circuit 82, thus on the basis of the magnitude relations between the voltages and $V_0$, the signal H or L can be outputted. Here, $V_0$ is decided by the voltage division ratio of the level shift circuit 81 and the threshold value of the NOT circuit 82 itself.

By doing this, compared with the conventional example using the comparator, the control unit can be miniaturized and reduced in cost. The comparator is composed of several transistors and diodes, while the NOT circuit can be composed of only two transistors and the price can be lowered to about ⅒.

And, Vu-flag and Vv-flag are set to the signal H or L, so that the number of combinations of the flags is $2^2$, that is, 4. For simplicity of explanation, the kinds of combinations thereof are indicated by A to D as shown in Table 1.

TABLE 1

| Region | Vu-flag | Vv-flag |
| --- | --- | --- |
| A | L | H |
| B | L | L |
| C | H | L |
| D | H | H |

On the other hand, in FIG. 4, the combinations can be made to correspond to the specific regions A to D. For example, as mentioned above, if Vu-flag and Vv-flag are the signal L, the intersection of $V_0$ and $\theta$ is always included in the region B (indicated by hatching). Further, the reverse is also true and when the intersection of $V_0$ and $\theta$ is included in the region B, Vu-flag and Vv-flag are the signal L. The same may be said with the other regions A, C, and D and the relation between FIG. 4 and Table 1 is held.

Figure 6:
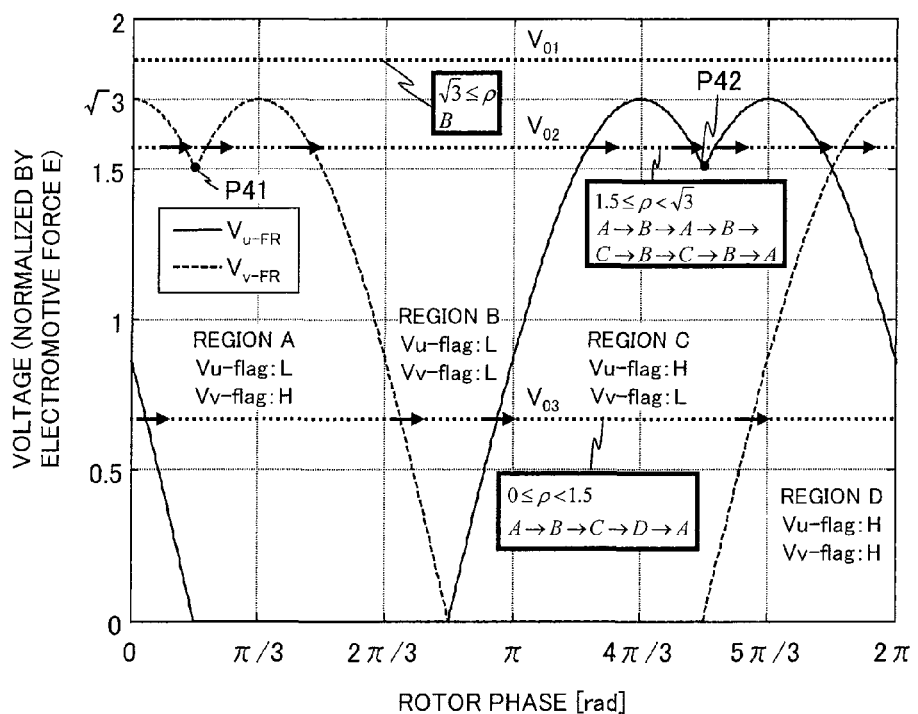
FIG. 6 is a diagram showing the decision result of the region by the comparator when the permanent magnet synchronous motor rotates forward.

FIG. 6 shows the change in the region when the permanent magnet synchronous motor 1 rotates free when there are three different threshold values available. In this embodiment, by detecting the change, the phase $\theta$ is inferred.

However, in FIG. 6, when the threshold value is set incorrectly to an excessive value, the phase $\theta$ cannot be decided. Namely, when it is expressed by Formula (8) like the threshold value $V_0 = V_{01}$, it is found that the region B is always kept unchanged. Further, in Formula (11) which will be described later, $\rho = V_0/E$ is defined, so that in FIG. 6, $\rho$ is used for explanation.

$$V_o \geq \sqrt{3} \cdot E \tag{8}$$

In this case, for the electromotive force E, the threshold value $V_0$ is excessively high, so that Vu-flag and Vv-flag are always set to the signal L. To avoid it, in this embodiment, $V_0$ is set in relation to Formula (9) indicated below.

$$\sqrt{3} \cdot E > V_o \tag{9}$$

However, from the viewpoint of avoidance of noise, the minimum value of $V_0$ is limited and actually, in the low-speed region, Formula (9) cannot always be held. At this time, in the range where Formula (9) is not held, that is, in the low-speed region indicated by Formula (10) obtained by substituting Formula (1) for Formula (8), in this system, the rotor phase inferred value $\theta FR$ and rotation speed inferred value $\omega FR$ cannot be obtained correctly.

$$V_o/\sqrt{3} \cdot Ke \geq \omega \tag{10}$$

Therefore, in the low-speed region indicated by Formula (10), the motor 1 is stopped once and then is restarted. Therefore, the voltage reference calculation unit 11 outputs Vu*, Vv*, and Vw* for DC positioning or using the short-circuit brake and stops once and then restarts the permanent magnet synchronous motor 1. This respect will be described later.

The rotor phase-rotation speed inference unit 10 that is a characteristic unit of this embodiment, on the basis of the change in Vu-flag and Vv-flag, that is, the change in the region, infers the rotation speed ω and the phase θ.

For simplicity of explanation, as indicated by Formula (11) aforementioned, the ratio $V_0/E$ of the threshold value $V_0$ to the electromotive force E is defined by ρ.

$$\rho = V_0/E \quad (11)$$

In FIG. 6, the changes in the region when the rotational direction is the forward direction (forward rotation) are shown in the cases of the threshold values $V_{02}$ and $V_{03}$. The change in the region depends upon the magnitude relation between ρ and 1.5. The reason is that when ρ is 1.5, the minimum phase of electromotive force may change, for example, at P41 and P42 shown in FIG. 6, Vu-flag or Vv-flag changes suddenly. Further, when the rotational direction is the backward direction (backward rotation), the region changes inversely.

From the aforementioned, it may be said that the change in the region depends upon the magnitude relation between p and 1.5 and the rotational direction. Conversely speaking, if the change in the region is detected and analyzed, the magnitude relation between ρ and 1.5 and the rotational direction can be inferred.

Next, on the basis of the change in the region, a method for inferring the magnitude relation between ρ and 1.5 and the rotational direction will be explained.

Figure 7:
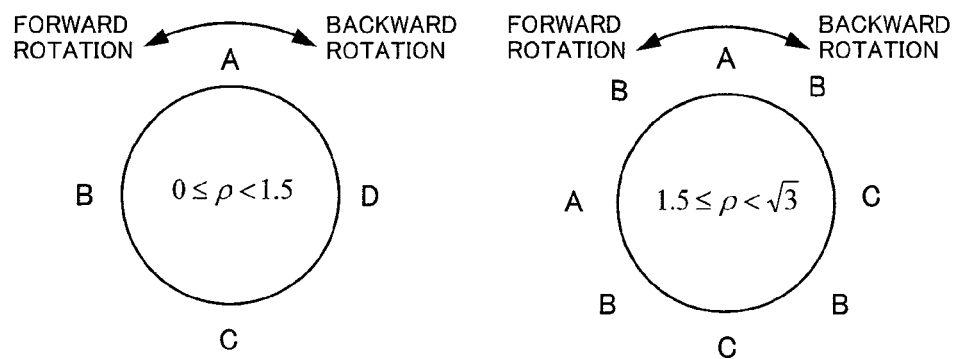
FIG. 7 is a diagram showing the change of the decision result of the region by the comparator.

If the change in the region is arranged properly on the basis of FIG. 6, FIG. 7 is obtained. FIG. 7, for example, when ρ is within the range indicated by Formula (12) like the threshold value $V_{03}$ shown in FIG. 6 and the rotational direction is the forward direction, shows that the change in the region repeats " ... A→B→C→D→A→ ... ".

$$0 < \rho < 1.5 \quad (12)$$

FIG. 7 shows that the change C→D is included in the change in the region only when ρ is smaller than 1.5 and the rotational direction is the forward direction. As mentioned above, the specific change pattern is a basis for inferring the magnitude relation between ρ and 1.5 and the rotational direction. Similarly, if the change patterns for inferring them are extracted from FIG. 7, for example, they are arranged properly as shown in Table 2.

TABLE 2

| ρ | Rotational direction | Change pattern for identifying ρ and rotational direction |
|---|---|---|
| $0 \leq \rho < 1.5$ | Forward rotation | C → D, D → A |
|  | Backward rotation | A → D, D → C |
| $1.5 \leq \rho \sqrt{3}$ | Forward rotation | D should not exist in the change pattern. |
|  | Backward rotation | D should not exist in the change pattern. |

Table 2 shows that when D is included in the change pattern, ρ is smaller than 1.5. Further, the rotational direction can be discriminated by referring to the region appearing before and after D.

On the other hand, when D is not included in the change pattern, Table 2 shows that ρ is within the range indicated by Formula (13) indicated below, though the rotational direction cannot be found.

$$1.5 < V_0/E < \sqrt{3} \quad (13)$$

The reason is that as shown in FIG. 6, when Formula (13) is held, regardless of the rotational direction, the change in the region repeats "A→B→A→B→C→B→C→B→A→. . . " and cannot be distinguished.

Figure 8:
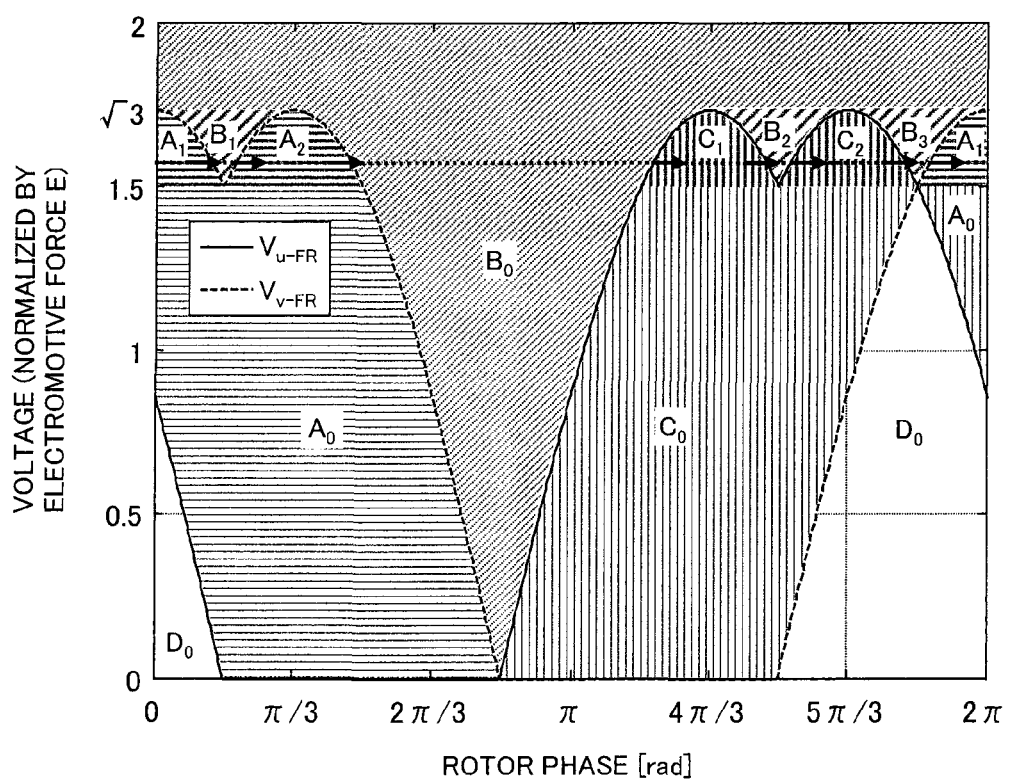
FIG. 8 is a diagram showing the detailed decision result of the region by the comparator when the permanent magnet synchronous motor rotates forward.
Figure 9:
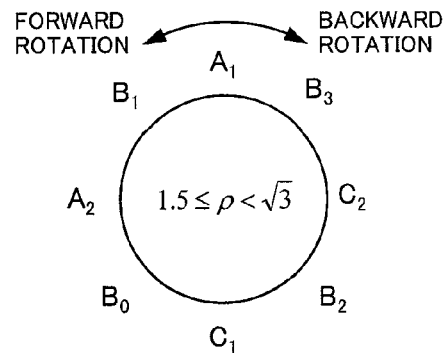
FIG. 9 is a diagram showing the change of the detailed decision result of the region by the comparator.

Therefore, the rotor phase-rotation speed inference unit 10 stores not only the change in the region but also the changing timing of the region, thereby discriminating the rotational direction. For simplicity of explanation, as shown in FIG. 8, each region is added with a subscript, subdivided, and distinguished. Originally, the distinction of the regions is based on the flags shown in Table 1, so that the regions subdivided by the subscripts cannot be distinguished. However, it can be solved by using the changing timing of the flags. For example, to identify $B_0$ from the regions $B_0$ to $B_3$, it may be used that the staying time in the region $B_0$, as shown in FIG. 8, is longer than the staying time in any other optional region. Further, after identification of the region $B_0$, on the basis of the region $B_0$, the other subscribed regions can be distinguished. The change in the region in this case is shown in FIG. 9. To discriminate the rotational direction, for example, Table 3 may by referred to on the basis of the region $B_0$.

TABLE 3

| ρ | Rotational direction | Change pattern for identifying ρ and rotational direction |
|---|---|---|
| $1.5 \leq \rho \sqrt{3}$ | Forward rotation | $A_2 \to B_2, B_2 \to C_1$ |
|  | Backward rotation | $C_1 \to B_2, B_2 \to A_2$ |

As mentioned above, the rotor phase-rotation speed inference unit 10 stores the change in the region and the changing timing of the region and checks them with the specific change pattern shown in Table 2 or 3, thereby the magnitude relation between ρ and 1.5 and the rotational direction can be inferred. Further, for practical use, to avoid the influence of noise, at the inference time thereof, several checks may be made.

Next, a method for inferring the relation between the phase θ and the time will be explained on the basis of the magnitude relation between ρ and 1.5 and the rotational direction.

Hereinafter, the case that the rotational direction is inferred to be the forward direction will be explained, though the case of the backward rotation can be inferred similarly.

Figure 10:
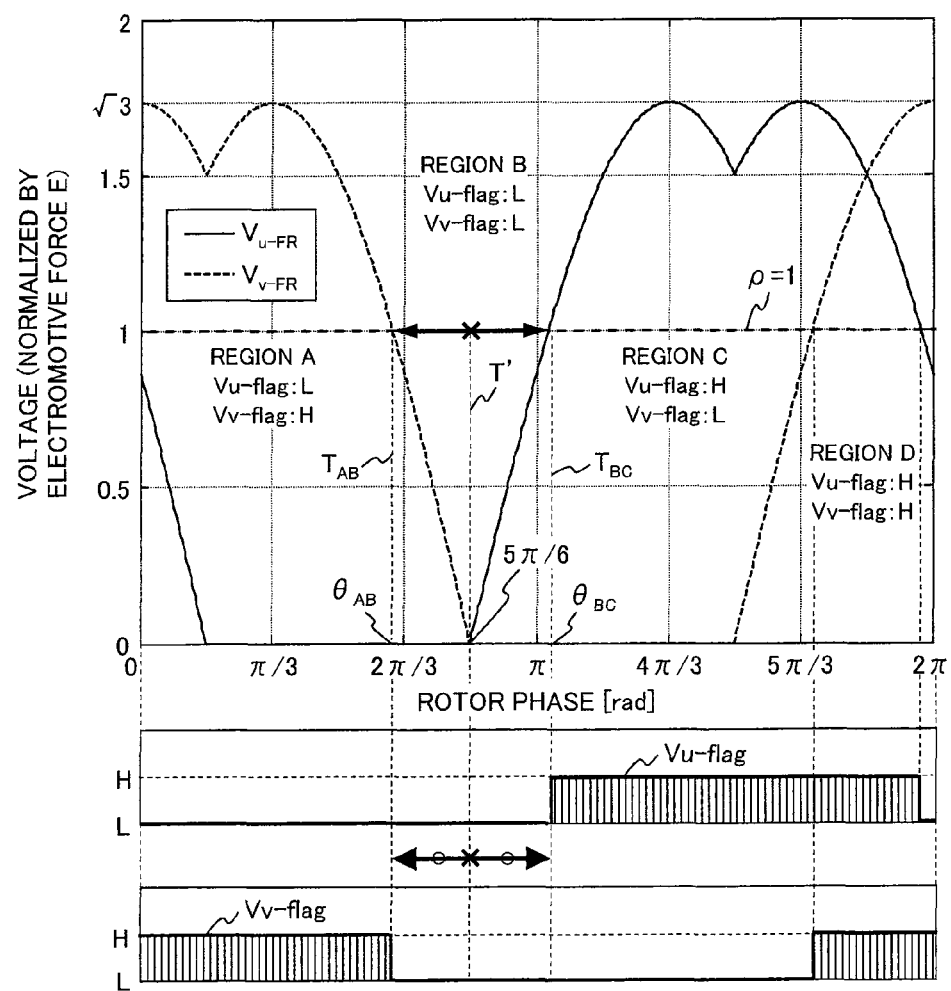
FIG. 10 is a diagram showing an example of rotor phase inference based on the flag change by the rotor phase-rotation speed inference unit.

Firstly, when the region changes like " . . . A→B→C→D→A→ . . . ", as shown in FIG. 7, the magnitude relation between ρ and 1.5 is inferred as Formula (12). In this case, as shown in FIG. 10, the time when the region changes like A→B is assumed as $T_{AB}$, and the time when the region changes like B→C is assumed as $T_{BC}$, and the phases θ at $T_{AB}$ and $T_{BC}$ are expressed respectively by $\theta_{AB}$ and $\theta_{BC}$.

$\theta_{AB}$ and $\theta_{BC}$ depend on ρ, so that if ρ is known, $\theta_{AB}$ and $\theta_{BC}$ can be known. However, in FIG. 10, ρ is set at 1 for explanation, though it is known that ρ exists within the range of 0<ρ<1.5, and a detailed value of ρ is unknown, and $\theta_{AB}$ and $\theta_{BC}$ cannot be inferred. The reason that ρ is unknown is that in this system, the A/D port for detection of the electromotive force E is omitted and ρ cannot be calculated on the basis of Formula (11).

Therefore, using the symmetry of $V_{u-FR}$ and $V_{v-FR}$, the phase θ is inferred. An inferred value θ⁻ of the phase θ at the time T' indicated by Formula (14) indicated below, on the basis of the symmetry of $V_{u-FR}$ and $V_{v-FR}$, is inferred as indicated by Formula (15).

$$T' = (T_{AB} + T_{BC})/2 \quad (14)$$

$$\theta^- = 5\pi/6 \quad (15)$$

Figure 11:
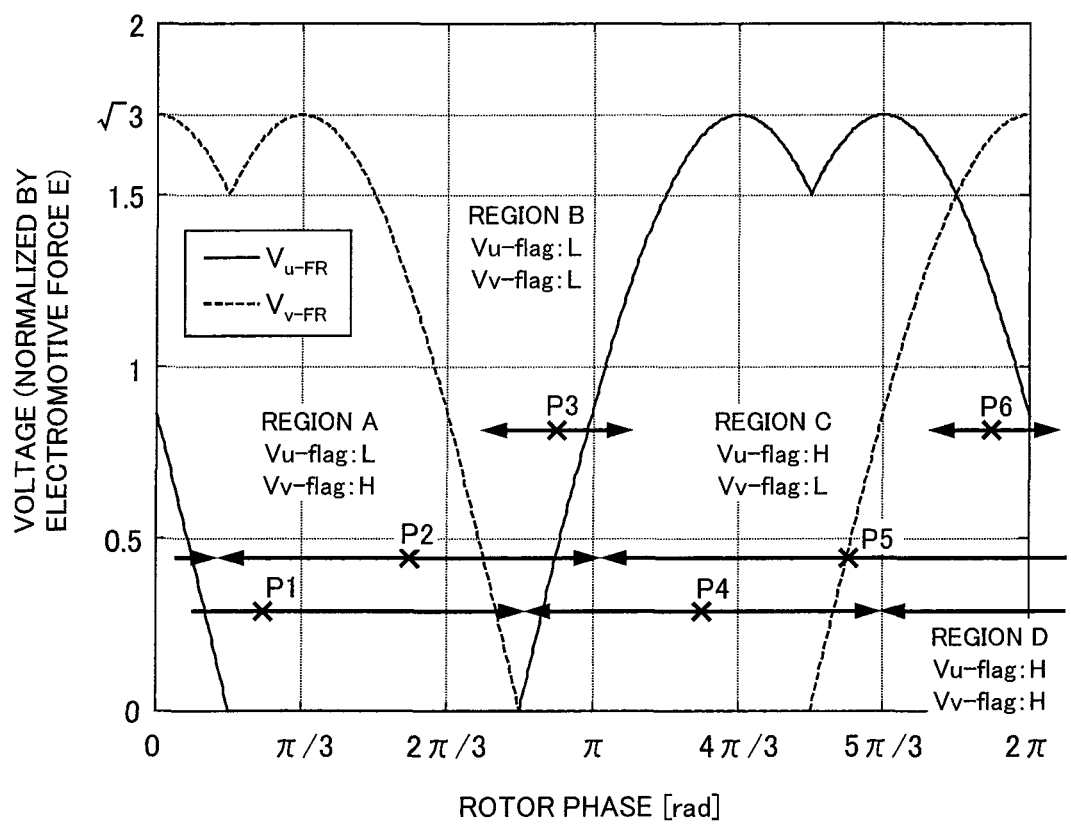
FIG. 11 is a diagram showing an example of rotor phase inference when the threshold voltage is lower than 1.5 times that of the electromotive force.

Similarly, when the permanent magnet synchronous motor 1 makes one revolution, as shown in FIG. 11, the 6 locations of P1 to P6 are known as intermediate positions between the point of rise time and the point of breaking time of Vu-flag and Vv-flag, so that the relation between the inferred rotor phase θ~ and the time can be obtained.

Figure 12:
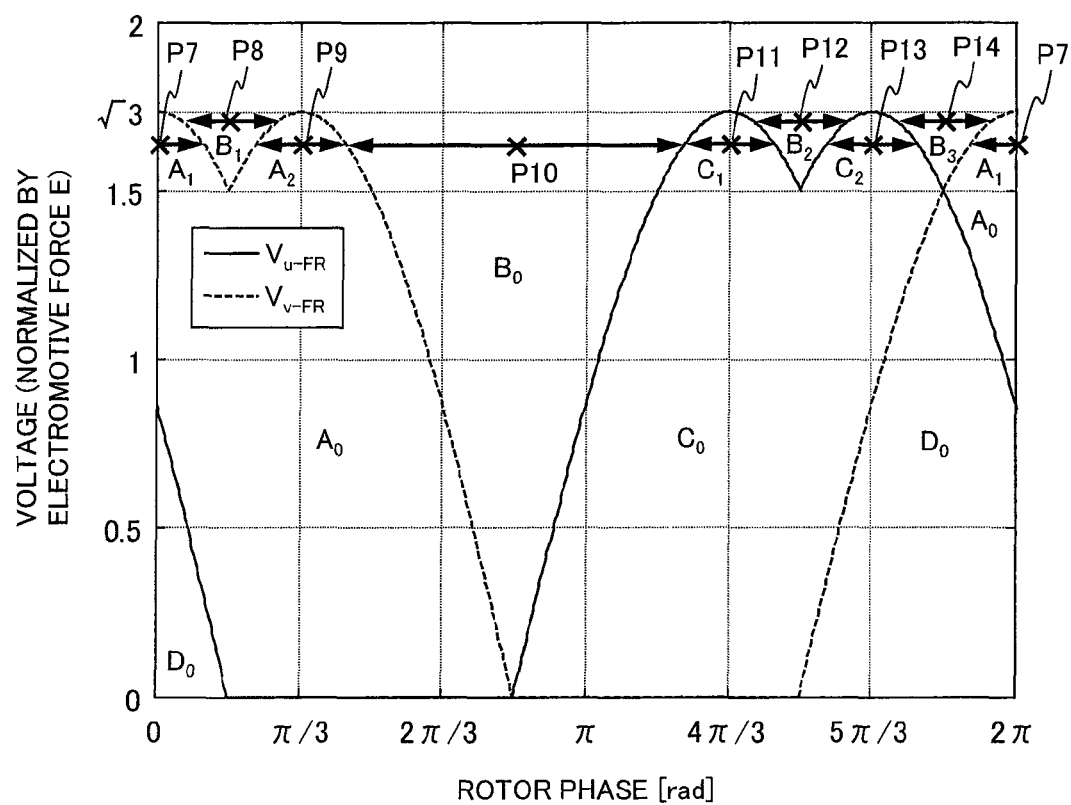
FIG. 12 is a diagram showing an example of rotor phase inference when the threshold voltage is higher than 1.5 times that of the electromotive force.

Even when the magnitude relation between ρ and 1.5 is inferred as Formula (13), as shown in FIG. 12, the 8 locations of P7 to P14 are known as intermediate positions between the point of rise time and the point of breaking time of Vu-flag and Vv-flag, so that the relation between the inferred rotor phase θ~ and the time can be obtained.

Further, if the points known in this way are added and furthermore, the symmetry of $V_{u\text{-}FR}$ and $V_{v\text{-}FR}$ is applied, the points for inferring the relation between the inferred rotor phase θ~ and the time may be considered innumerably without being limited to P1 to P14.

If P1 to P14 shown in FIGS. 11 and 12 are arranged properly, Table 4 is obtained.

TABLE 4

| Threshold voltage $V_0$ | No | Time | Rotor phase inferred value θ~ |
|---|---|---|---|
| $0 \leq \rho < 1.5$ | P1 | $(T_{CD} + T_{AB})/2$ | $\pi/6$ |
| | P2 | $(T_{DA} + T_{BC})/2$ | $3\pi/6$ |
| | P3 | $(T_{AB} + T_{BC})/2$ | $5\pi/6$ |
| | P4 | $(T_{AB} + T_{CD})/2$ | $7\pi/6$ |
| | P5 | $(T_{BC} + T_{DA})/2$ | $9\pi/6$ |
| | P6 | $(T_{CD} + T_{DA})/2$ | $11\pi/6$ |
| $1.5 \leq \rho \sqrt{3}$ | P7 | $(T_{B4A1} + T_{A1B1})/2$ | 0 |
| | P8 | $(T_{A1B1} + T_{B1A2})/2$ | $\pi/6$ |
| | P9 | $(T_{B1A2} + T_{A2B2})/2$ | $2\pi/6$ |
| | P10 | $(T_{A2B2} + T_{B2C1})/2$ | $5\pi/6$ |
| | P11 | $(T_{B2C1} + T_{C1B2})/2$ | $8\pi/6$ |
| | P12 | $(T_{C1B2} + T_{B2C2})/2$ | $9\pi/6$ |
| | P13 | $(T_{B2C2} + T_{C2B3})/2$ | $10\pi/6$ |
| | P14 | $(T_{C2B3} + T_{B4A1})/2$ | $11\pi/6$ |

For example, P1 shown in Table 4, at the intermediate time between the time $T_{AB}$ of the region A→B and the time $T_{CD}$ of the region C→D, indicates that the inferred rotor phase θ~ is π/6. The same may be said with P2 to P14.

From the above-mentioned, when the permanent magnet synchronous motor 1 makes one revolution, the inferred rotor phase θ~ can be detected at least 6 times.

Next, on the basis of the relation between the inferred rotor phase θ~ and the time, a method for inferring the rotation speed ω will be explained. Here, an inferred value of the rotation speed ω is expressed by ω~. The time differential of the phase θ is the rotation speed ω, so that the time differential of the inferred rotor phase θ~ can be expressed by the inferred rotation speed ω~. Here, the time differential of the inferred rotor phase θ~, for example, can be obtained from the imperfect differential.

The inferred rotor phase θ~, as shown in Table 4, is updated intermittently only at a specific time. In principle, the same may be said with the inferred rotation speed ω~. Therefore, to restart the permanent magnet synchronous motor 1 at an optional time, a method for obtaining the phase θ and rotation speed ω at an optional time on the basis of the known inferred rotor phase θ~ and inferred rotation speed ω~ will be described below.

Firstly, assuming that the rotation speed ω of the free-running permanent magnet synchronous motor 1 is almost fixed, the rotation speed ω at an optional time can be made equal to the updated value of the inferred rotation speed ω~ in the neighborhood of the time. The reason is that in the use of a fan and a pump of the permanent magnet synchronous motor 1 to be restarted, the inertia thereof is high, so that the rotation speed ω does not change suddenly. Therefore, the inferred value of the rotation speed ω at the time of restart of the motor can be expressed by ωFR.

Figure 13:
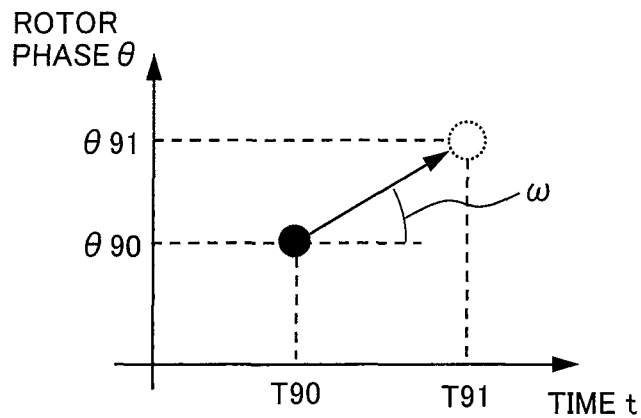
FIG. 13 is a diagram showing an example of rotor phase inference at an optional time based on the inferred values of the rotor phase and rotation speed at a certain time.

Next, an inferring method for the phase θ at an optional time will be described. As shown in FIG. 13, assuming that the inferred rotor phase θ~ and inferred rotation speed ω~ at the time T90 are known respectively as θ90 and ω90, it is considered to obtain θ91 which is the phase θ at the time T91 on the basis of the aforementioned values. Here, as described above, during the period from T90 to T91, the rotation speed ω is assumed to be almost fixed. At this time, as shown by Formula (16) indicated below, the product of the difference between T90 and T91 and the inferred rotation speed ω~ is added to θ90 as a basis, thus θ91 can be obtained.

$$\theta_{91} = \theta_{90} + \omega^\sim (T_{91} - T_{90}) \quad (16)$$

By application of Formula (16), the influence of noise can be suppressed. For example, instead of the time T90 and θ90, a plurality of relations between the time and the inferred rotor phase θ~ are stored beforehand and the mean value thereof may be used.

From the above-mentioned, the phase θ at an optional time can be inferred and particularly, the inferred value of the phase θ at the time of restart of the motor can be expressed by θFR.

The voltage reference calculation unit 11, on the basis of the rotor phase inferred value θFR and the rotation speed inferred value ωFR, calculates voltage reference values Vu*, Vv*, and Vw* to be impressed to the permanent magnet synchronous motor 1 and restarts the permanent magnet synchronous motor 1. Thereafter, if necessary, on the basis of IDC', the voltage reference calculation unit 11 calculates the voltages Vu*, Vv*, and Vw* and the operation of the permanent magnet synchronous motor 1 is continued.

In the present invention, as a basic policy, $V_0$ is designed low so as to permit Formula (9) to be held. The reason is, as described previously, to obtain information on the electromotive force from Vu-flag and Vv-flag. However, from the viewpoint of avoidance of noise, the minimum value of $V_0$ is limited and actually, in the low-speed region, Formula (9) cannot always be held. At this time, in the range where Formula (9) is not held, that is, in the low-speed region indicated by Formula (10) obtained by substituting Formula (1) for Formula (8), in this system, the rotor phase inferred value θFR and rotation speed inferred value ωFR cannot be obtained correctly.

Therefore, in the low-speed region indicated by Formula (10), as described previously, the voltage reference calculation unit 11 outputs Vu*, Vv*, and Vw* for DC positioning or using the short-circuit brake and stops once and then restarts the permanent magnet synchronous motor 1.

As a first means for stopping once, the disclosed DC positioning may be cited. Namely, the coil of the permanent magnet synchronous motor 1 is excited by a direct current, and a magnetic field in a fixed direction is produced, and the rotor of the permanent magnet synchronous motor 1 is attracted to it, thus the permanent magnet synchronous motor 1 can be stopped. Further, as a second means, the short-circuit brake may be cited. Namely, the switching elements Sup, Svp, and Swp or Sun, Svn, and Swn are short-circuited, and the kinetic energy of the rotor is released as heat energy, thus the permanent magnet synchronous motor 1 can be stopped.

On the other hand, in the high-speed region, θFR and ωFR can be obtained correctly, so that the voltage reference calculation unit 11, on the basis of the inferred values and a preset constant of the permanent magnet synchronous motor 1, outputs Vu*, Vv*, and Vw* for the synchronous operation control or vector control. At this time, ωFR is temporarily set as a speed reference ωr* under the vector control, thus the permanent magnet synchronous motor 1 can be restarted free of a shock. Thereafter, according to ωr* given from the host, the speed control is executed.

The voltage reference calculation unit 11, when executing the vector control, composes a feedback loop based on the current value IDC' obtained from the current detection unit 6. During execution of the vector control, it is necessary to always obtain information on the phase θ and rotation speed ω, though by use of axial error calculations or an observer, they can be inferred from IDC'.

The voltage reference calculation unit 11, when the permanent magnet synchronous motor 1 rotates backward after start of the synchronous operation control or vector control, decelerates and stops the permanent magnet synchronous motor 1 once. Thereafter, the voltage reference calculation unit 11 accelerates the permanent magnet synchronous motor 1 forward according to the rotation speed reference ωr* given from the host. By doing this, the voltage reference calculation unit 11 can restart the backward-rotating permanent magnet synchronous motor 1.

(Second Embodiment)

Figure 14:
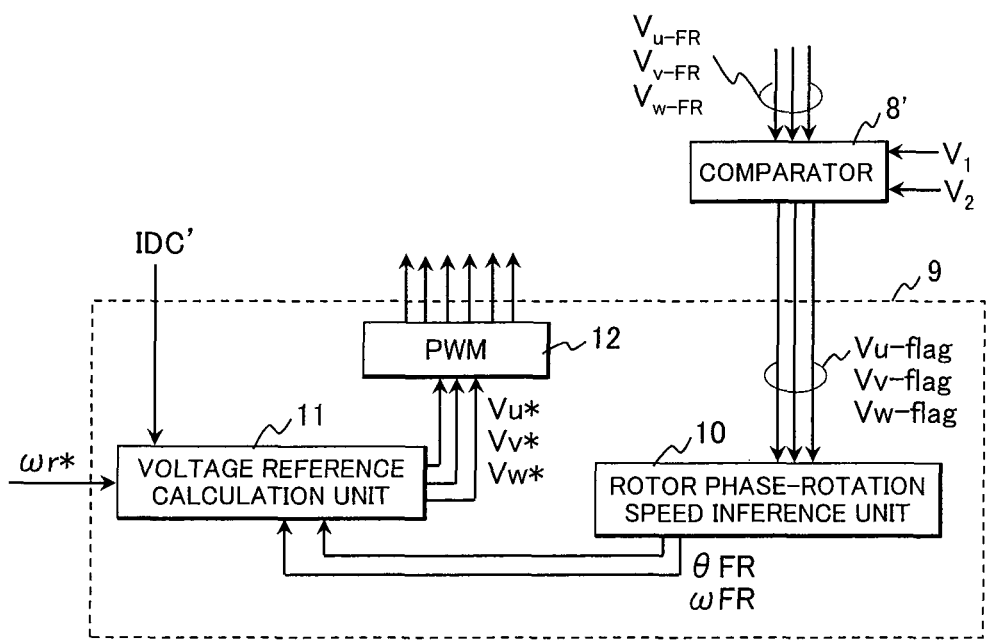
FIG. 14 is a partial schematic view of the control unit of the permanent magnet synchronous motor of the second embodiment of the present invention.

FIG. 14 is a partial schematic view of the control unit of the permanent magnet synchronous motor 1 of the second embodiment of the present invention.

FIG. 14 adopts a comparator 8' instead of the comparator 8 shown in FIG. 1 and the control elements of numerals 10 to 12 in the microcomputer 9 correspond to those shown in FIG. 1 and they are the same. Further, the other same components are omitted.

As explained by referring to FIG. 4, the comparator 8 of the first embodiment compares the magnitude relations between $V_{u-FR}$ or $V_{v-FR}$ and the threshold value $V_0$. However, when $V_{u-FR}$ or $V_{v-FR}$ is close to the threshold value $V_0$, there is a fear that Vu-flag or Vv-flag may be chattered due to noise.

To solve it, it may be considered to use hysteresis.

Figure 15:
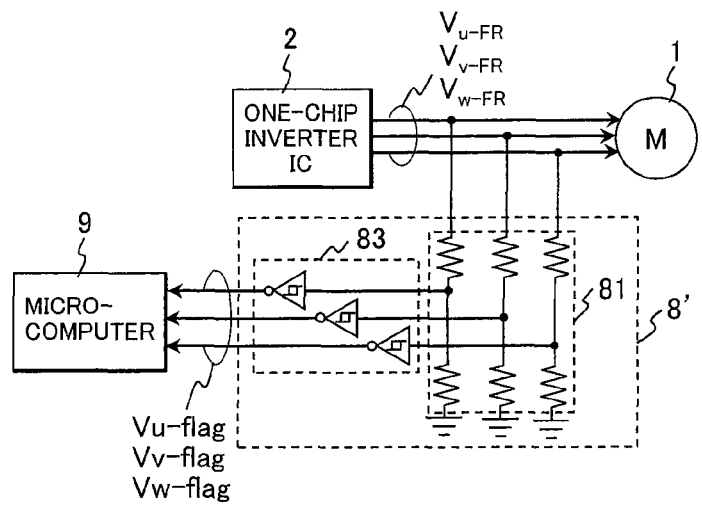
FIG. 15 is a diagram showing a concrete circuit configuration example of the comparator of the second embodiment.

FIG. 15 is a diagram of a concrete configuration example of the comparator 8' of the second embodiment of the present invention.

Similar to FIG. 5, $V_{u-FR}$ and $V_{v-FR}$ are voltage-divided by the level shift circuit 81 and the voltages are inputted to a Schmitt circuit 83, thus on the basis of the voltages and the magnitude relations between $V_1$ and $V_2$, the signal H or L can be outputted. Here, $V_1$ and $V_2$, similarly to $V_0$, are decided by the voltage division ratio of the level shift circuit 81 and the threshold value of the Schmitt circuit 83 itself. The reason that the two threshold values $V_1$ and $V_2$ are used is to permit the Schmitt circuit 83 to have a hysteresis characteristic and prevent chattering.

Figure 16:
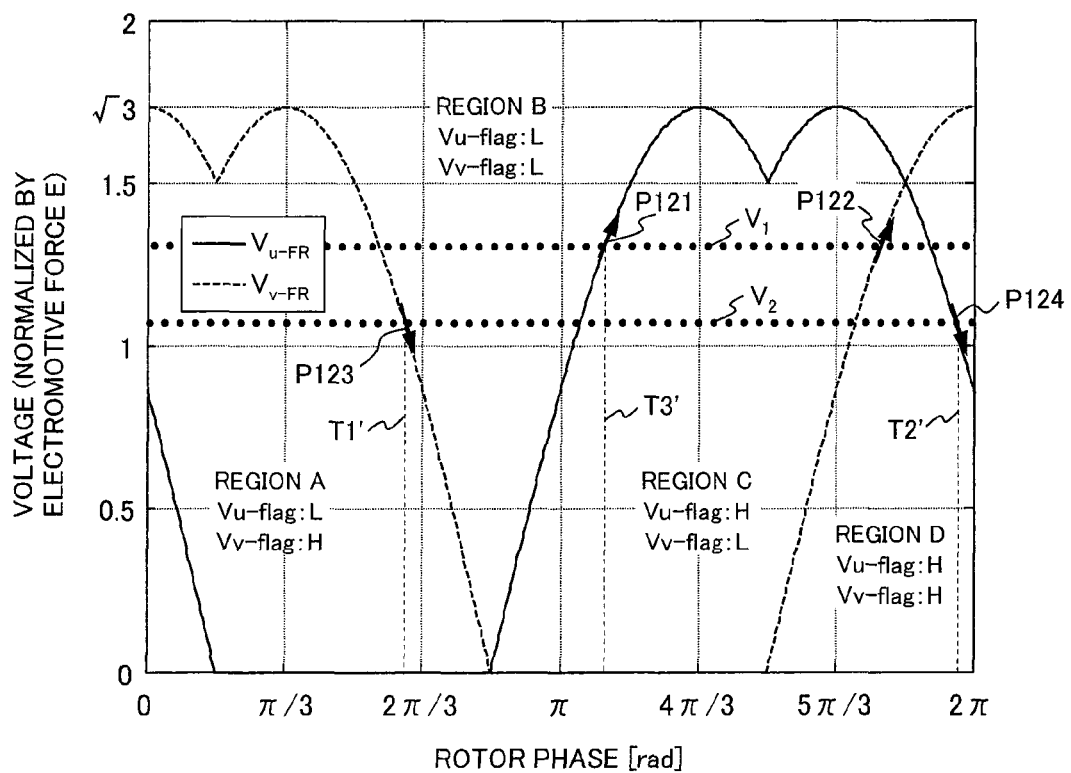
FIG. 16 is a diagram showing an example of rotor phase inference based on the flag change by the rotor phase-rotation speed inference unit when the comparator having two threshold voltages is used.

Namely, as shown in FIG. 16, in the comparison of the magnitude relations, different references $V_1$ and $V_2$ are used at the rise time and breaking time. For example, at the rise time of $V_{u-FR}$ and $V_{v-FR}$ when the free running is executed in the forward direction, the magnitude relations are compared on the basis of $V_1$ and at the locations of P121 and P122, Vu-flag and Vv-flag are started. Inversely, at the breaking time of $V_{u-FR}$ and $V_{v-FR}$, the magnitude relations are compared on the basis of $V_2$ and at the locations of P123 and P124, Vu-flag and Vv-flag are shut down.

Next, the rotor phase inference when using hysteresis will be explained.

If the system when no hysteresis is used is applied straight, when the rotor phase is inferred by combining the rise time and breaking time, an error is caused due to the hysteresis. However, if a hysteresis equivalent to noise is used, the chattering can be prevented sufficiently, and the magnitude is sufficiently smaller than the electromotive force, so that a rotor phase inference error can be ignored.

Further, in the high-speed region, $V_{u-FR}$ and $V_{v-FR}$ are high, so that by ignoring the hysteresis, the rotor phase may be inferred similarly to the first embodiment.

(Third Embodiment)

Figure 17:
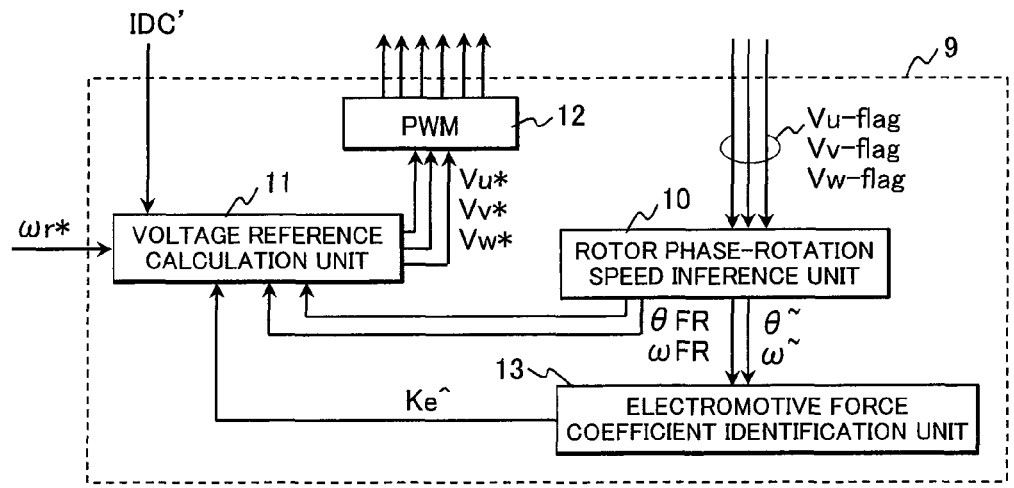
FIG. 17 is a partial schematic view of the control unit of the permanent magnet synchronous motor of the third embodiment of the present invention.

FIG. 17 is a partial schematic view of the control unit of the permanent magnet synchronous motor 1 of the third embodiment of the present invention.

FIG. 17 is different from FIG. 1 in that an electromotive force coefficient identification unit 13 is added and the electromotive force coefficient identification unit 13 outputs an identified value Ke^ of an electromotive force coefficient Ke which is one of the constants of the permanent magnet synchronous motor 1 on the basis of θ~ and ω~ and the voltage reference calculation unit 11 identifies a preset electromotive force coefficient set value Ke* by Ke^. The others are the same as those shown in FIG. 1 and the components unnecessary for explanation are omitted.

The voltage reference calculation unit 11 uses Ke^ instead of Ke*, thereby improving the robustness of the control unit and since the measurement and setting of Ke are unnecessary, the convenience of the control unit can be improved.

Figure 18:
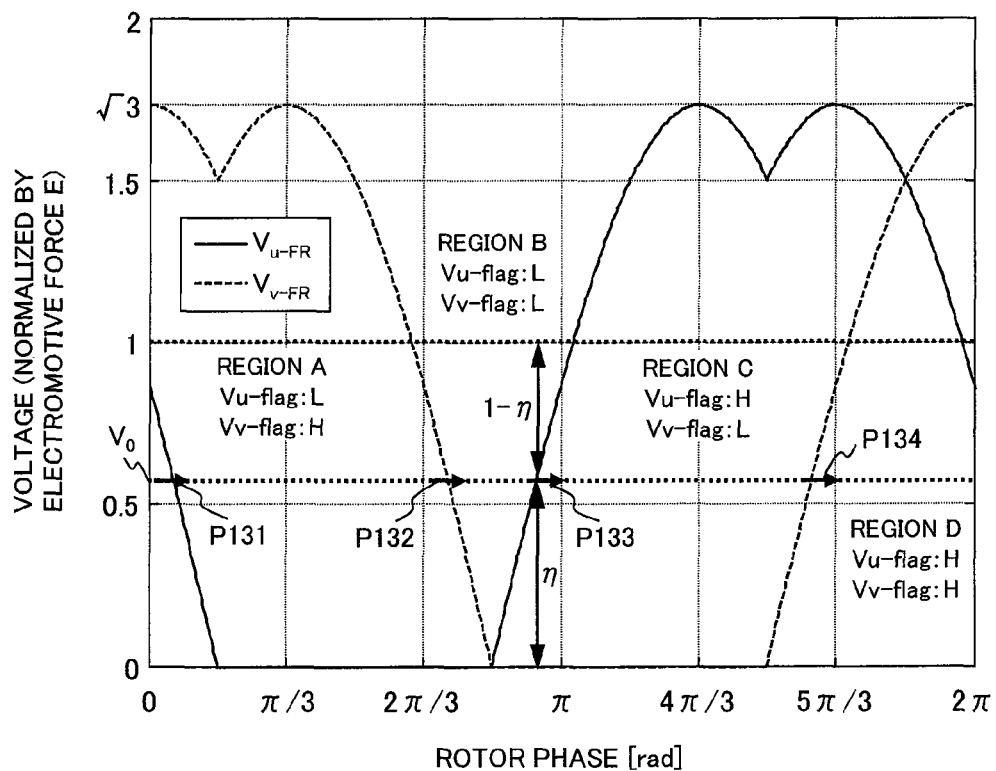
FIG. 18 is a waveform diagram of the output terminal voltage when the moment of the change of the decision result of the region by the comparator of the third embodiment is taken up.

As shown by P131 to P134 in FIG. 18, at the moment the region changes, either of $V_{u-FR}$ and $V_{v-FR}$ is equal to $V_0$. Here, the case that the moment the region changes from B to C at P133, that is, as shown by Formula (17) indicated below, $V_{u-FR}$ becomes equal to $V_0$ will be explained.

$$V_o = V_{u\text{-}FR} \tag{17}$$

A ratio η of $V_{u-FR}$ to E is defined by Formula (18) indicated below.

$$\eta = V_{u\text{-}FR}/E \tag{18}$$

η is a numerical value in the vertical axis shown in FIG. 18. The reason is that in FIG. 18, $V_{u-FR}$ is normalized and expressed by E. η is decided only by the phase θ, so that η can be inferred on the basis of the inferred rotor phase θ~. Assuming the inferred value of η as η~, Formula (19) indicated below can be obtained from Formulas (1), (17), and (18).

$$Ke\hat{} = V_o/\eta\tilde{}\cdot\omega\tilde{} \tag{19}$$

Ke^ can be obtained by Formula (19) and the voltage reference calculation unit 11 can identify Ke* by Ke^.

What is claimed is:

1. A control unit of a permanent magnet synchronous motor comprising:
   a DC power supply,
   an inverter for converting DC power supplied from said DC power supply to AC power,
   said permanent magnet synchronous motor supplied with said AC power via multi-phase output terminals of said inverter,
   a phase inferring means for inferring a phase of a rotor of said permanent magnet synchronous motor on the basis of a magnitude relation between an inter-line voltage, between a phase voltage having a minimum value of the multi-phase electrical potentials generated at said output terminals of said inverter and another phase voltage, and a predetermined threshold voltage when said permanent magnet synchronous motor runs free, and
   a rotational direction inferring means for inferring a rotational direction of said free-running permanent magnet synchronous motor on the basis of magnitude relations between said at least two different inter-line voltages and said threshold voltage.

2. The control unit of a permanent magnet synchronous motor according to claim 1, wherein said control unit infers a ratio or a magnitude of said threshold voltage to electromotive force generated by said free-running permanent magnet synchronous motor on the basis of said magnitude relation between said at least one inter-line voltage and said threshold voltage.

3. The control unit of a permanent magnet synchronous motor according to claim 1, wherein said control unit sets said threshold voltage so as to make said ratio of said threshold voltage to said electromotive force generated by said permanent magnet synchronous motor smaller than $\sqrt{3}$.

4. The control unit of a permanent magnet synchronous motor according to claim 1, wherein said control unit infers a relation between said rotor phase of said free-running permanent magnet synchronous motor and a time on the basis of timing when said magnitude relation between said at least two-phase inter-line voltage and said threshold voltage is reversed.

5. The control unit of a permanent magnet synchronous motor according to claim 4, wherein said control unit infers a rotation speed of said permanent magnet synchronous motor on the basis of said relation between said rotor phase of said free-running permanent magnet synchronous motor and said time.

6. The control unit of a permanent magnet synchronous motor according to claim 5, wherein said control unit infers said rotor phase of said permanent magnet synchronous motor at an optional time on the basis of said relation between said rotor phase of said free-running permanent magnet synchronous motor and said time and said inferred value of said rotation speed.

7. The control unit of a permanent magnet synchronous motor according to claim 6, wherein when an absolute value of said inferred value of said rotation speed of said free-running permanent magnet synchronous motor is smaller than a preset value, said control unit executes DC positioning or short-circuit braking and when said absolute value of said inferred value of said rotation speed is larger than said preset value, said control unit starts synchronous operation or vector control on the basis of said inferred value of said rotor phase of said permanent magnet synchronous motor and said inferred value of said rotation speed.

8. The control unit of a permanent magnet synchronous motor according to claim 7, wherein when a rotational direction of said permanent magnet synchronous motor is an reverse direction after start of said synchronous operation or said vector control, said control unit stops said permanent magnet synchronous motor and/or thereafter, accelerates it in a forward direction.

9. The control unit of a permanent magnet synchronous motor according to claim 7, wherein at a stage that said permanent magnet synchronous motor runs free, on the basis of said threshold voltage, said inferred value of said rotor phase of said permanent magnet synchronous motor, and said inferred value of said rotation speed, said control unit identifies an electromotive force coefficient of said permanent magnet synchronous motor.

10. The control unit of a permanent magnet synchronous motor according to claim 1, wherein said control unit detects said magnitude relation between said inter-line voltage and said threshold voltage using a level shift circuit and a NOT circuit.

11. The control unit of a permanent magnet synchronous motor according to claim 1, wherein said control unit detects said magnitude relation between said inter-line voltage and said threshold voltage using a level shift circuit and a Schmitt circuit.

12. The control unit of a permanent magnet synchronous motor according to claim 1, wherein said inverter is a three-phase inverter IC.

13. A control unit of a permanent magnet synchronous motor comprising:
 a DC power supply,
 an inverter for converting DC power supplied from said DC power supply to AC power,
 said permanent magnet synchronous motor supplied with said AC power via multi-phase output terminals of said inverter, and
 a comparing means for comparing an inter-line voltage which is a voltage between a DC negative terminal of said inverter and at least one-phase output terminal other than a minimum value with a predetermined threshold voltage,
 a phase inferring means for inferring a phase of a rotor of said permanent magnet synchronous motor on the basis of a magnitude relation between the inter-line voltage and the predetermined threshold voltage, and
 a rotational direction inferring means for inferring a rotational direction of said free-running permanent magnet synchronous motor on the basis of magnitude relations between said at least two different inter-line voltages and said threshold voltage.

14. A control method for a permanent magnet synchronous motor comprising the steps of:
 converting DC power supplied from a DC power supply to AC power by an inverter,
 supplying said AC power to said permanent magnet synchronous motor via multi-phase output terminals of said inverter,
 comparing an inter-line voltage between a DC negative terminal of said inverter and at least one output terminal other than a minimum value with a predetermined threshold voltage and inferring a phase of a rotor of said permanent magnet synchronous motor on the basis of said magnitude relation between them, and
 inferring a rotational direction of said free-running permanent magnet synchronous motor on the basis of magnitude relations between said at least two different inter-line voltages and said threshold voltage.

* * * * *